United States Patent [19]

Jacobson et al.

[11] 4,322,030
[45] Mar. 30, 1982

[54] LUBRICATION AND COOLING SYSTEM FOR A HIGH SPEED ULTRACENTRIFUGE DRIVE ASSEMBLY

[75] Inventors: Kenneth E. Jacobson, Fremont; William S. Gutierrez, San Francisco; Williams G. Patterson, Palo Alto, all of Calif.

[73] Assignee: Beckman Instruments, Inc., Fullerton, Calif.

[21] Appl. No.: 20,384

[22] Filed: Mar. 14, 1979

[51] Int. Cl.³ .................. B04B 9/00; F01M 9/00
[52] U.S. Cl. .................. 233/23 R; 184/6.18; 184/31; 310/54
[58] Field of Search ............ 233/23 R, 1 R, 1 A, 233/24; 184/6.16, 6.18, 6.22, 6.28, 8, 26, 31, 104 R; 308/134.1; 310/52, 53, 54; 417/902, 372, 321; 415/110

[56] References Cited

U.S. PATENT DOCUMENTS

| 770,385 | 9/1904 | Pott et al. | |
|---|---|---|---|
| 1,720,398 | 7/1929 | Harrigan | 184/31 X |
| 2,171,749 | 9/1939 | Hollander et al. | 310/87 |
| 3,218,490 | 11/1965 | Eis et al. | 310/54 |
| 3,674,196 | 7/1972 | Gutter | 233/4 |
| 3,676,723 | 7/1972 | Drucker | 310/68 B |
| 3,877,546 | 4/1975 | Shrader | 184/6.18 |
| 4,018,304 | 4/1977 | Lolachi et al. | 184/7 R |
| 4,140,441 | 2/1979 | Patterson | 184/6.18 X |

FOREIGN PATENT DOCUMENTS 327180 3/1930 United Kingdom ........... 184/31

OTHER PUBLICATIONS

News and Comment on Centrifuging and Allied Equipment and Techniques; Measuring & Scientific Equipment Ltd.; vol. 1, No. 1, Jul. 1966.

Primary Examiner—Stanley N. Gilreath
Attorney, Agent, or Firm—R. J. Steinmeyer; F. L. Mehlhoff; William H. May

[57] ABSTRACT

A lubricating system which is completely self contained within the vacuum environment of an electric direct drive system for an ultracentrifuge rotor. The lubricating system also functions as a cooling means for an electric motor within the drive system by the use of a unique cooling feed tube in the central portion of the drive system. An orifice in the top of the cooling feed tube will control the head of the lubricating medium within the system. Specific design of the fit between the direct drive assembly and the drive housing in conjunction with the head on the lubricating medium will regulate the drip rate of the lubricating medium to the bearings. The use of the unique lubrication and cooling system maintains the close tolerances of the various elements such as the high speed bearings of the drive system because the temperature of the overall drive system is controlled.

13 Claims, 2 Drawing Figures

LUBRICATION AND COOLING SYSTEM FOR A HIGH SPEED ULTRACENTRIFUGE DRIVE ASSEMBLY

BACKGROUND OF THE INVENTION

The present invention is directed to a lubricating system and, more particularly, is directed to a lubricating system which also provides for cooling of an electric drive motor within a vacuum environment for an ultracentrifuge.

Most lubricating systems for drives of ultracentrifuges are maintained outside of the vacuum environment which is found in the rotor chamber of the centrifuge. Most of these lubricating systems use oil and are regulated by orifices or valves that can become plugged or damaged. In many instances the amount of oil which is introduced to the spindle or drive shaft is variable according to how fast the shaft is rotating. When the spindle is at high speed, a high oil flow may be too great and more than necessary, causing operating problems to the centrifuge. On the other hand, at low spindle speeds not a sufficient amount of oil being supplied for the necessary lubrication during rotation.

When an electric motor such as an induction motor is utilized for high speed rotation, it is necessary to provide some type of cooling to the armature of the motor. However, if the motor is to be placed in a vacuum environment for operation such as explained in my copending patent application entitled A Direct Drive High Speed Ultracentrifuge, it is necessary to provide some type of cooling to the motor. In other non-vacuum operations some type of fan or circulation means is utilized to promote the flow of cooling air. However, in a vacuum it is not possible to circulate air to transfer the heat generated during the operation of the motor. Therefore, the utilization of an electric motor in a vacuum environment poses a unique problem with respect to providing the requisite cooling functions for the motor during its high speed operation.

It is also desirable, when a drive system is operating in a vacuum environment, that external lubricating lines not be used because their interface would represent potential adverse effects on the vacuum environment. Also these lines present possible leakage points in the lubricating system.

SUMMARY OF THE INVENTION

The present invention comprises a lubricating and cooling system which supplies a necessary and constant flow of lubricating medium to the bearing parts of the drive system in a vacuum while at the same time providing a cooling function of an electric induction motor used in the drive system. The overall system incorporates the utilization of a cooling feed tube which extends from an oil reservoir and low speed pump into a longitudinal cavity within the armature support of an induction drive motor. The flow of lubricating oil into the cooling feed tube exits through an orifice at the top of the tube and is sprayed onto the interior surface of the cavity in the armature. The spinning of the armature provides a coating of oil on the cavity interior surface to absorb some heat and move to another chamber to transfer the heat.

The lubrication and cooling system is a self contained recirculating system within the drive spindle housing. A low speed motor is utilized exterior to the vacuum environment to drive a low speed gear pump to provide the necessary circulation and flow rate of the cooling or lubricating medium. The size of an orifice in the cooling feed tube provides in conjunction with the oil pump the requisite head on the oil for it to reach the upper bearings. The stator housing is cooled by a separate cooling system and acts in cooperation with the lubricating system to provide a cooling source for the lubricating medium or oil. The gear pump has one of the gears floating or loose while the other is connected to the shaft of pump drive the motor so that the necessary close tolerances between the gears and the housing to maintain the oil seal is achieved without the extremely expensive machined tolerances that would be necessary if both gears were fixed to shafts.

Controlled close fits or tolerances in specific areas or lands on the spindle assembly are utilized to control the drip rate of the oil or lubricating oil for the bearings in conjunction with the head on the oil. Also, the size or length of the lands contributes to the control of the drip rate. This approach prevents plugging of any oil flow to the bearings. No requirement exists for orifices or valves. The flow rate of the oil is relatively constant regardless of the speed of the drive spindle.

DETAILED DESCRIPTION OF THE INVENTION

Figure 1:
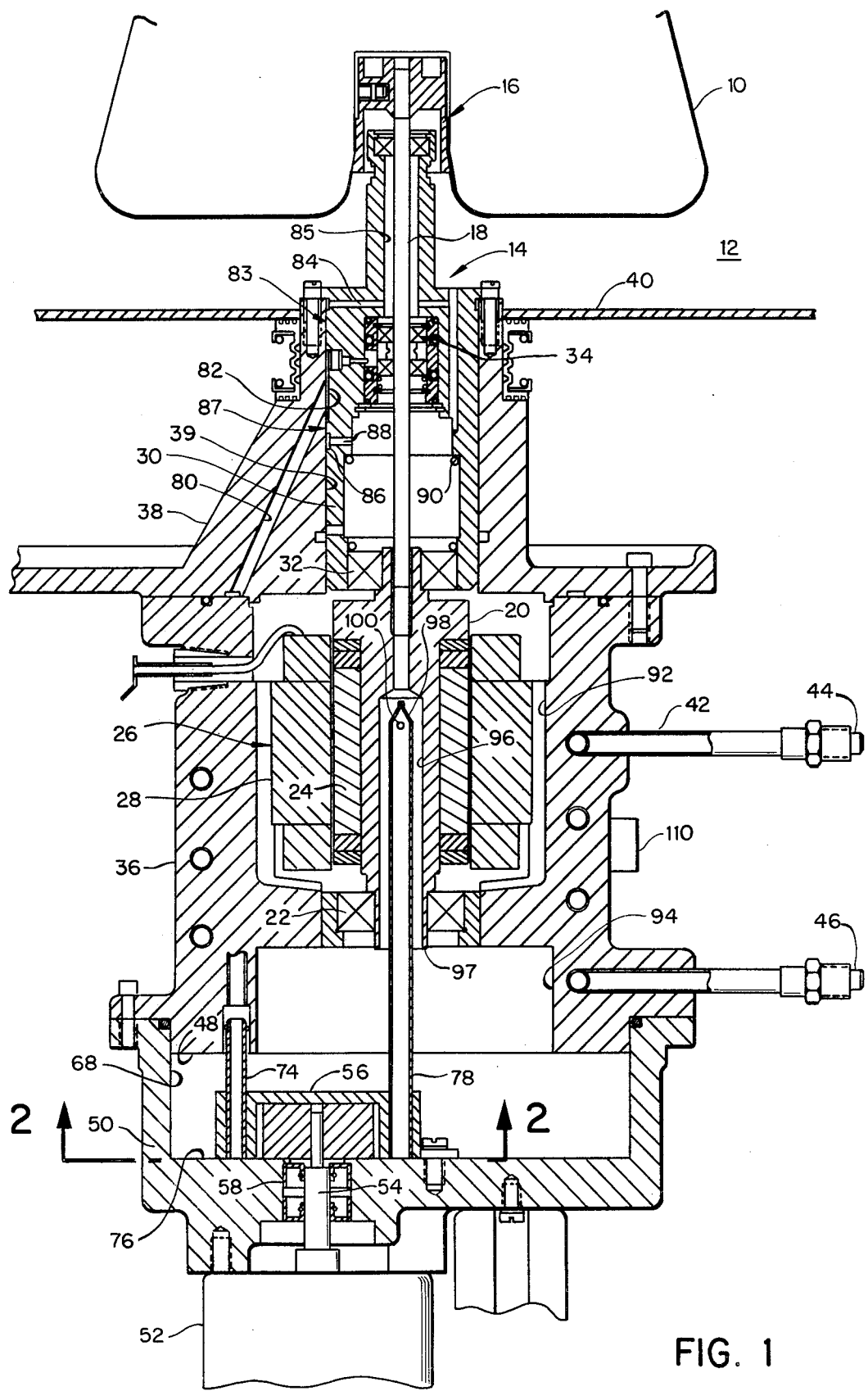
FIG. 1 is a vertical sectional view through the drive assembly showing the lubrication and cooling system.

FIG. 1 shows a rotor 10 which is mounted within a vacuum chamber 12 on a drive spindle assembly 14. The spindle assembly 14 comprises a hub assembly 16 which interfaces with the rotor 10. The drive spindle 18 extends downward from the hub assembly for connection with an armature shaft 20 which holds the lower high speed bearing 22. An armature 24 of an induction motor 26 is also mounted on the armature shaft 20. An upper high speed bearing 32 is press fit on the armature shaft 20 and is positioned in the upper bearing housing 30 around the drive spindle 18.

The induction motor 26 has a housing 36 which is mounted below the drive mount plate or upper housing 38. Both the drive mount plate housing 38 and the induction motor housing 36 are located below the bottom plate 40 of the rotor chamber 12.

Located within the wall of the induction motor housing 36 is a cooling coil 42 which receives a heat transfer medium through the inlet port 46 and exits through the port 44 to a separate heat exchanger.

It should be noted that the rotor chamber 12 has a vacuum environment during operation in order to eliminate the wind resistance and heat friction buildup when the rotor is operating at extremely high speeds such as 80,000 r.p.m.'s. As explained in my copending application entitled A Direct Drive High Speed Ultracentrifuge, the spindle assembly 14 is designed for removal through the bottom plate 40 of the chamber 12 to provide easy replacement in the case of a bearing failure. The spindle assembly 14 as well as the induction motor 26 is designed for operation within a vacuum environment. Consequently, it is necessary to provide not only a lubricating system for the drive assembly, but also a special cooling system for the operation of the induction motor 26, since no external air can be circulated through the motor.

Attached to the bottom 48 of the motor housing 36 is an lubricating medium or oil pan 50 which contains the lubricating oil. In order to provide the circulation of the oil within the drive assembly, a low speed motor 52 is mounted below the oil pan 50. The drive shaft 54 from the motor 52 extends into a gear pump assembly 56. The motor 52 is isolated from the vacuum environment within the drive assembly by a vacuum seal 58. As shown more clearly in FIG. 2, the gear pump 56 is comprised of two preferably plastic gear members 60 and 62 wherein the first gear member 60 is driven by the shaft 54 from the motor 52 while gear member 62 is free floating so that the necessary close tolerances are maintained between the interior walls 64 of the gear pump and the ends 65 of the gear teeth 66 to promote a seal between the teeth ad the wall to maintain a constant flow of the oil. These close tolerances are maintained without the requirement for the normal tight machining necessary when both gears are attached to shafts. The motor 52 is designed to operate at very low speeds such as 40 to 45 r.p.m.'s, so that the vacuum seal 58 in FIG. 1 will not be susceptible to damaging wear.

Figure 2:
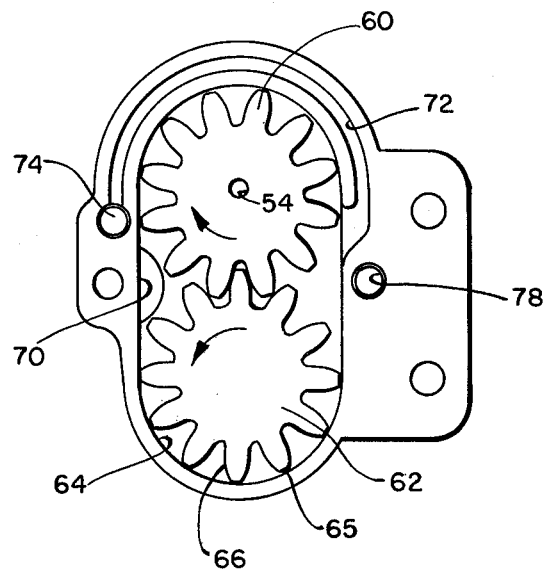
FIG. 2 is a sectional view taken along the lines 2—2 in FIG. 1 showing the lubricating pump system.

With reference to FIG. 2 the oil enters from the oil reservoir 68 in FIG. 1 through the side aperture 70 in the gear pump assembly 56 and is pulled by the gear teeth rotating in the direction of the arrows to move the oil around and into the channel 72 to the flow tube 74. Also, oil is moved through a channel, not shown, located in the bottom 76 of the reservoir 68 to the central cooling conduit or tube 78.

As shown in FIG. 1, the oil is directed by the conduit 74 up through the motor housing 36 to the inclined oil passage 80 and into the upper oil annulus 82 adjacent the upper portion of the spindle assembly 14 near the damper bearing housing 34. Oil is also directed up through the cooling feed tube 78 to an elongated cavity 96 within the armature shaft 20. At the top 98 of the cooling feed tube 78 are two orifices 100 (one of which is not shown) which direct the oil outward against the interior of the cavity 96 as will be explained. The size of the orifices 100 in the cooling feed tube operates in conjunction with the oil gear pump assembly 52 to provide the desired head on the oil to move it up the conduit 74 and through the inclined passage 80 to the upper oil annulus 82 and up along the land 83 to the upper damper bearing support port 84. For exemplary purposes, in one design the 0.060 inch orifice in the cooling feed tube provides one foot of head on the oil.

The drip rate of oil to the damper bearing is controlled not only by the clearance between the upper bearing housing 30 and the drive mount plate housing 38 along the land 83, but also the length or vertical distance of the land 83 between the annulus 82 and the supply port 84. Similarly, the drip rate of the oil to the upper high speed bearing 32 is controlled not only by the clearance between the upper bearing housing 30 and the drive mount plate housing 38 along the land 87, but also the length of the land 87 between the annulus 82 and the second annulus 86.

The oil which proceeds through the upper damper bearing supply port 84 enters the tubular opening 85 in the spindle housing 14 and drips down into the damper bearing 34. The oil which enters the lower annulus 86 and out the upper high speed bearing supply port 88 will drip down through the spring assembly 90 and onto the upper high speed bearing 32. In addition, some oil from the damper bearing 34 will drip onto the upper high speed bearing 32.

The overall design of the oil flow through the supply ports 84 and 88 is envisioned to be in the range of several drops per minute. The oil exiting the high speed bearing 32 will proceed down around the outer portion of the stator 28 through the passage 92 and provide lubrication to the lower high speed bearing 22. The oil exiting from the lower high speed bearing 22 will drop into the oil reservoir 68. As the oil leaves the lower high speed bearing 22 it will drop into the oil reservoir 68.

The lubricating oil not only provides the necessary lubrication for the bearings in the spindle assembly 14, but also provides a cooling function for the interior of the induction motor armature 24. As discussed previously, the armature shaft 20 has an elongated central cavity 96. The cooling feed tube 78 projects from the oil pump assembly 56 up into the elongated cavity 96 within the armature shaft 20. Located at the upper end 98 of the cooling feed tube 78 is an orifice 100. Oil is pumped by the gear pump assembly 56 up through the cooling feed tube 78 and out the orifice 100 to impinge on the wall of the cavity 96. As the armature 24 which directly drives the spindle 18 is spinning or rotating at very high speeds, the oil which exits the orifice 100 will hit the high speed rotating interior surface of the cavity 96 and coat this interior cavity. Heat which is being generated by electrical forces in the armature will be absorbed in this film of oil on the interior surface of the cavity 96. The oil will proceed down the interior wall of the cavity 96. At the bottom 97 of the cavity 96 the oil will be slung or thrown out against the cooler interior surface 94 of the motor housing 36. The cooling medium through the conduit 42 will aid in cooling the lubricating oil before it returns or drops back into the oil reservoir 68 for recirculation through the system. The flow of the oil through the cooling feed tube 78 is designed to be approximately 400 ml per minute.

The oil flow rate through both the flow channel 74 for lubricating the bearings in the spindle assembly as well as the flow of oil through the cooling feed tube 78 is generally constant since the whole lubricating system is self contained.

Another important feature of the present invention is the incorporation of a thermistor 110 on the motor housing 36 to provide an automatic control of the temperature of the motor housing 36 as well as the drive mount plate housing 38. In this way the ideal temperature of the overall system can be maintained by controlling the flow and temperature of the heat transfer medium in the cooling coil 42. Since the temperature of the motor housing 36 controls the cooling of the closed system of lubricating oil within the drive assembly and stator 28, it is important to maintain a desirable preset temperature of the motor housing 36. The maintenance of a predetermined temperature range within the system is extremely desirable in order to control the close fits that are required for the high speed bearings and the oil lubrication flow regulating system. This regulating system refers to the fit between the upper bearing housing 30 within the interior wall 39 of the drive mount plate housing 38.

What is claimed is:

1. A drive system for operating in a vaccum to power a rotative device, said system comprising:
   a housing;
   a drive spindle in driving communication with the interior of said housing;

an upper bearing housing for rotative support of the upper portion of said spindle;

an armature shaft connected to said spindle for rotative movement with said spindle;

bearing means in said housing for rotatively supporting said spindle and said armature shaft;

an induction motor armature connected to said armature shaft;

an induction motor stator mounted within said housing and in operative relation with said armature;

a lubricating medium within said housing for lubricating said bearing means; and a circulating system self-contained completely within said housing for said lubricating medium, said circulating system operating independent of the operation of said drive spindle, said induction motor armature and stator so that the rate of circulation of said lubricating medium does not depend upon the operation of said drive spindle, induction motor armature and stator.

2. A drive system as defined in claim 1, wherein said circulating system for said lubricating medium comprises:

a gear pump;

a pump motor to drive said gear pump; and a flow passage for transferring said lubricating medium to said bearing means, said pump motor operating independent of said induction motor.

3. A drive system as defined in claim 2, wherein said gear pump comprises:

a pump housing;

a drive gear connected to said motor; and a floating gear in engaging operation with said drive gear, said drive gear and said floating gear in sealing alignment with said pump housing.

4. A drive system as defined in claim 3, wherein said drive gear and said floating gear have large enough teeth so that said lubricating medium will flow into said gears with a minimum of head pressure.

5. A drive system as defined in claim 1, and additionally comprising:

a stationary feed tube extending into the interior of said induction motor armature, said feed tube having at least one orifice, said circulating system including a gear pump within said housing and having said feed tube connected thereto, said gear pump in conjunction with the size of said orifice determining the flow of said lubricating oil into the interior of said induction motor armature to cool the interior of said induction motor armature.

6. A drive system as defined in claim 1, wherein said circulating system comprises:

a reservoir of a lubricating medium;

a closed system of routing channels for said lubricating medium within said housing;

means for circulating said lubricating medium within said closed system; and means for transferring said lubricating medium to the interior of said induction motor armature to cool said induction motor.

7. A drive system as defined in claim 6, wherein said induction motor armature has an interior wall into which said lubricating medium flows, said armature operating at high rotative speeds, causing said lubricating medium to be layered on said interior wall and receive heat of said armature.

8. A drive system for a high speed machine, said system comprising:

a drive assembly;

a housing for receipt of said drive assembly;

a drive shaft mounted within said drive assembly;

bearing means mounted on said drive shaft; and a lubricating system having a first flow channel to said bearing means; a second flow channel; a pump assembly to circulate a lubricating medium within said flow channels, the top of said first flow channel being farther above said pump assembly than said second flow channel; means on said second flow channel acting in conjunction with said pump assembly for controlling the head on said lubricating medium to move said lubricating medium to said top of said first flow channel.

9. A drive system as defined in claim 8 wherein said second flow channel comprises a tubular member with an enclosed upper end; and wherein said controlling means comprises at least one orifice in said second flow channel, the size of said orifice determining the head on said lubricating medium.

10. A drive system as defined in claim 8 and additionally comprising means for controlling the drip rate of said lubricating medium to said bearing means.

11. A drive system as defined in claim 10, wherein said drip rate controlling means comprises at least two annuluses at the interface of said drive assembly and said housing for receiving said lubricating medium from said first flow channel, said annuluses being sparated by a land on one of said drive assembly and said housing, the length of said land in conjunction with both the tolerance of fit between said drive assembly and said housing and said head on said lubricating medium controlling the drip rate of said lubricating medium to said bearings.

12. A drive system for a high speed machine, said system comprising:

a drive assembly;

a housing for receipt of said drive assembly, said drive assembly and said housing having a specific tolerance fit;

a drive shaft mounted in said drive assembly;

bearing means on said drive shaft;

means for supplying lubricating oil at a specified head adjacent said bearing means; and at least two annuluses at the interface of said drive assembly within said housing for receiving oil from said supplying means, said annuluses being separated by a land on one of said drive assembly and said housing, the length of said land in conjunction with both said specific tolerance fit between said drive assembly and said housing and said specified head on said oil by said supplying means controlling the drip rate of said oil to said bearing means.

13. A drive system for operating in a vacuum to power a rotative device, said system comprising:

a housing;

a motor mounted adjacent said housing;

a gear pump mounted in said housing, said motor in driving communication with said gear pump;

a drive shaft connected to said rotative device;

means mounted within said housing for rotating said drive shaft;

bearing means in said housing for rotatively supporting said drive shaft;

a lubricating medium within said housing for lubricating said bearing means; and conduit means for transferring said lubricating medium to said bearing means in response to the operation of said motor and gear pump, said motor operating independent of the operation of said driving means for said rotative device so that the rate of circulation of said lubricating medium does not depend upon the operative speed of said driving means for said drive shaft.

* * * * *